((12)) United States Patent
McCallum

(10) Patent No.: US 9,163,735 B2
(45) Date of Patent: Oct. 20, 2015

(54) FLOW DIVERTER

(76) Inventor: Peter Ronald McCallum, Queensland (AU)

( * ) Notice: Subject to any disclaimer, the term of this patent is extended or adjusted under 35 U.S.C. 154(b) by 928 days.

(21) Appl. No.: 13/387,131

(22) PCT Filed: Jul. 29, 2010

(86) PCT No.: PCT/AU2010/000951
§ 371 (c)(1),
(2), (4) Date: Mar. 14, 2012

(87) PCT Pub. No.: WO2011/011822
PCT Pub. Date: Feb. 3, 2011

(65) Prior Publication Data
US 2012/0160504 A1 Jun. 28, 2012

(30) Foreign Application Priority Data
Jul. 30, 2009 (AU) .................................. 2009903554

(51) Int. Cl.
*G01F 5/00* (2006.01)
*F16K 11/04* (2006.01)
*F16K 11/07* (2006.01)
*F16K 27/02* (2006.01)

(52) U.S. Cl.
CPC ................. *F16K 11/04* (2013.01); *F16K 11/07* (2013.01); *F16K 27/0263* (2013.01)

(58) Field of Classification Search
CPC .......... G01F 5/00; G01F 15/185; F16K 11/04
USPC ............... 137/269, 357, 597, 599.01, 599.11, 137/599.13
See application file for complete search history.

(56) References Cited

U.S. PATENT DOCUMENTS 3,256,735 A * 6/1966 Smith ............................ 73/201

FOREIGN PATENT DOCUMENTS

| DE | 9013546 | 11/1990 |
| DE | 9201362 | 3/1992 |
| GB | 2174779 | 11/1986 |
| GB | 2251904 | 7/1992 |
| NL | 1012761 | 2/2001 |
| WO | WO2008050075 | 5/2008 |

* cited by examiner

*Primary Examiner* — John Fox
*Assistant Examiner* — Reinaldo Sanchez-Medina
(74) *Attorney, Agent, or Firm* — Michael Haynes PLC; Michael N. Haynes

(57) ABSTRACT

A flow diverter is provided for use with a valve having a valve body with an inlet and an outlet separated by a valve seat, a valve member, an actuator for displacement of the valve member into and out of engagement with the valve seat, and a bonnet in which the valve member and the actuator are housed. The flow diverter has an elongate housing with an inlet end and an outlet end and which is configured to engage the valve body at the inlet end with the valve member and actuator removed from the valve body. The elongate housing defines an outlet passage and an inlet passage, the outlet passage being interposed between the inlet end and the inlet passage. An elongate flow guide is positioned within the housing. The flow guide is configured to engage the valve seat and, together with the housing, to define a flow path that confines the flow of fluid from the valve body and out of the outlet passage. The outlet passage and the inlet passage are configured for bridging with a device such as a water flow meter.

6 Claims, 4 Drawing Sheets

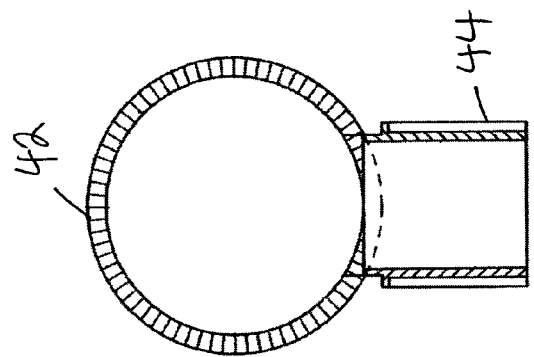
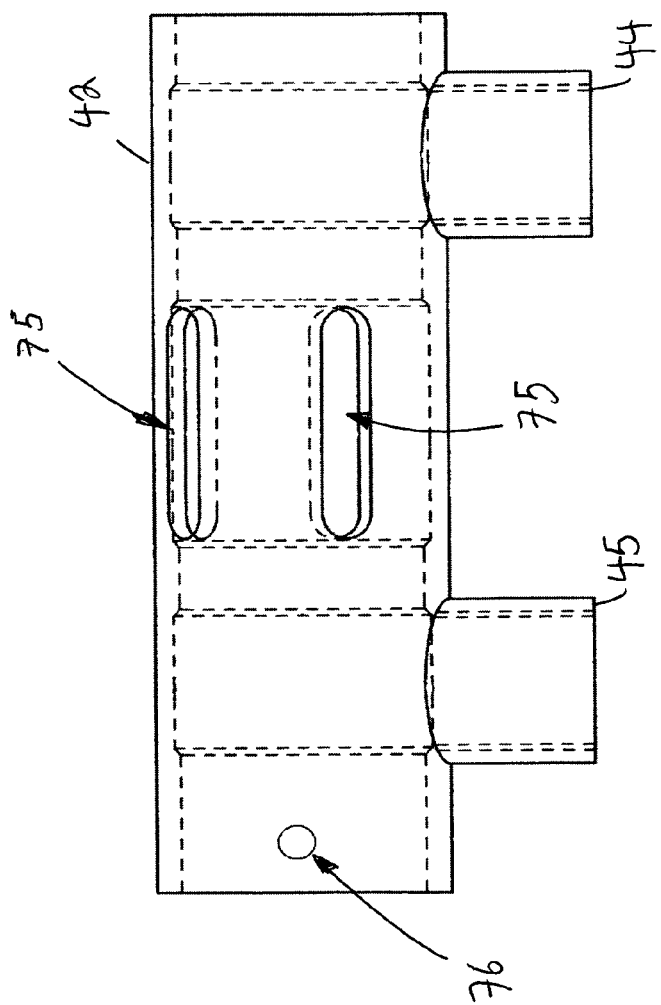

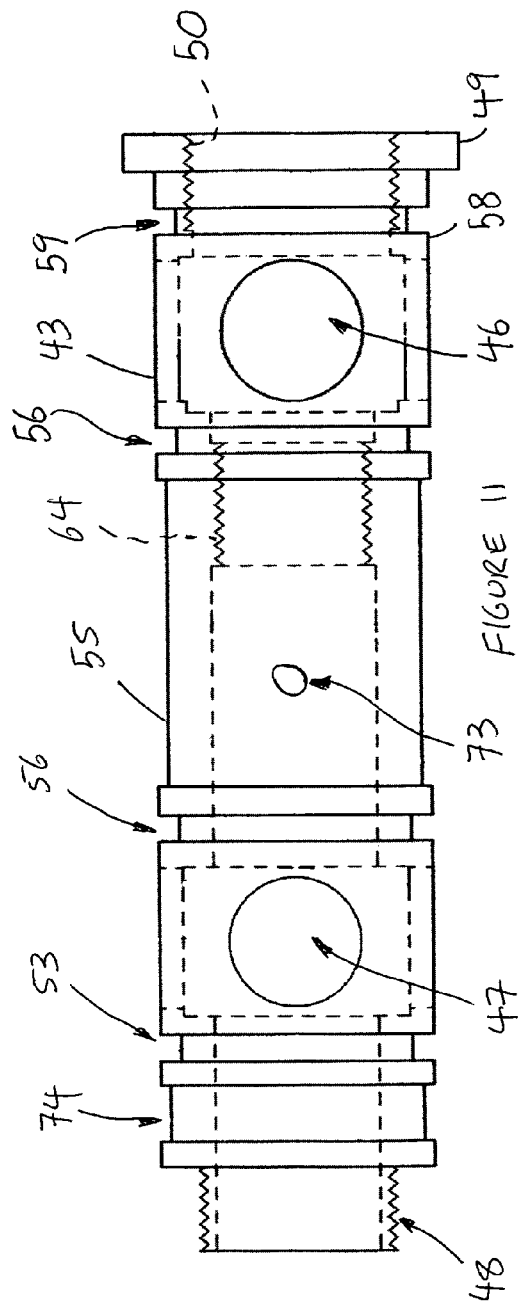
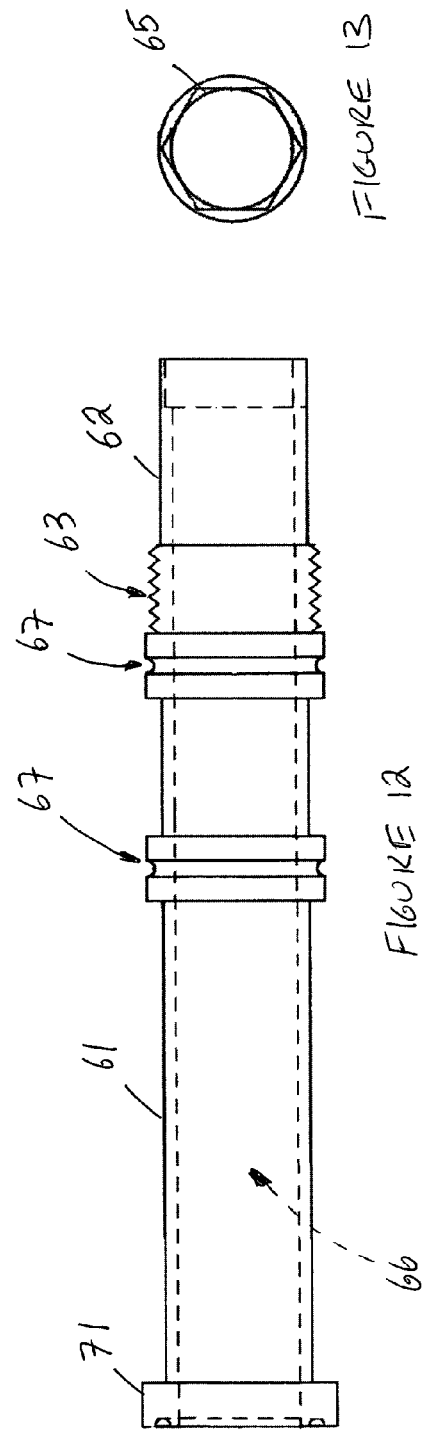

FLOW DIVERTER

FIELD OF THE INVENTION

This invention relates to a flow diverter. More particularly, this invention relates to a flow diverter for use with a valve having a valve body with an inlet and an outlet separated by a valve seat and a valve member displaceable into and out of engagement with the valve seat.

BACKGROUND TO THE INVENTION

It is often necessary to fit flow devices to existing plumbing installations. In many instances, it can be difficult to fit a desired flow device at a convenient location. For example, it may be necessary to fit a flow device upstream of a valve so that flow through the valve can either be measured or restricted.

A problem with such fitment is that the valve can often be positioned in a location where the conduit upstream of the valve is located in a wall or other structural component. In such a case, the only way to access such a conduit is to destroy or dismantle the structural component. As a result, even if the fitment were possible, the time spent and costs incurred in fixing or reassembling the structural component can be prohibitive.

SUMMARY OF THE INVENTION

According to a first aspect of the invention, there is provided a flow diverter for use with a valve having a valve body with an inlet and an outlet separated by a valve seat, a valve member, an actuator for displacement of the valve member into and out of engagement with the valve seat, and a bonnet in which the valve member and the actuator are housed, the flow diverter comprising an elongate housing having an inlet end and an outlet end and configured to engage the valve body at the inlet end with the valve member and actuator removed from the valve body, the elongate housing defining an outlet passage and an inlet passage, the outlet passage being interposed between the inlet end and the inlet passage; and an elongate flow guide positioned within the housing, the flow guide being configured to engage the valve seat and, together with the housing, to define a flow path that confines the flow of fluid from the valve body and out of the outlet passage, the outlet passage and the inlet passage being configured for bridging with a device such as a water flow meter.

The housing may include an outer housing member and a sleeve that is received within the outer housing member in a sealed manner and that defines inlet and outlet apertures that correspond with inlet and outlet openings of the outer housing member, respectively, to define the inlet and outlet passages, and a flow guide received within the sleeve and defining a peripheral projection that is engaged in a sealing manner with an internal surface of the sleeve, the flow guide being capable of being positioned such that the peripheral projection is interposed between the inlet and outlet apertures to direct fluid received at the inlet out through the outlet aperture and outlet opening of the housing.

An inlet end of the sleeve may be fastenable to the valve body and the flow guide may define a valve seat bearing member at an inner end of the flow guide. The flow guide may be axially adjustable with respect to the sleeve to bring the valve seat bearing member into sealing engagement with the valve seat when the sleeve is fastened to the valve body such that a fluid flow path is defined from an inlet end of the sleeve, between the sleeve and the flow guide, to the outlet passage.

The flow guide may itself define a bore so that, when the flow guide is axially displaced to disengage the valve seat bearing member from the valve seat, fluid can flow directly through the bore from the inlet end to the outlet end of the housing without being diverted.

The flow guide may be threaded along a portion of its length intermediate the peripheral projection and an outer end to engage, in a threaded manner, a corresponding threaded portion of the sleeve, the threaded portions of the flow guide and the sleeve being configured to permit said axial adjustment of the flow guide relative to the sleeve so that, once the sleeve has been fastened to the valve body, the flow guide can be adjusted so that the valve seat bearing member can engage the valve seat in a sealing manner.

The outer housing member may be rotatable with respect to the sleeve but may be constrained against axial displacement relative to the sleeve.

An outlet end of the sleeve may define an internally threaded socket to permit a fluid flow device such as a valve or conduit to be fastened to the housing.

The invention is now described, by way of example, with reference to the accompanying drawings. The following description is for illustrative purposes only and is not intended to limit the scope of the preceding paragraphs or the appended claims.

BRIEF DESCRIPTION OF THE DRAWINGS

FIG. 9 shows a side view of an outer housing member or cover of the flow diverter of FIG. 8.

FIG. 10 shows an outlet end view of the cover of FIG. 9.

FIG. 11 shows a side view of a sleeve of a housing assembly of the flow diverter of FIG. 8.

FIG. 12 shows a side view of a flow guide of the flow diverter of FIG. 8

FIG. 13 shows an outlet end view of the sleeve of FIG. 9.

DETAILED DESCRIPTION OF THE DRAWINGS

Figure 1:
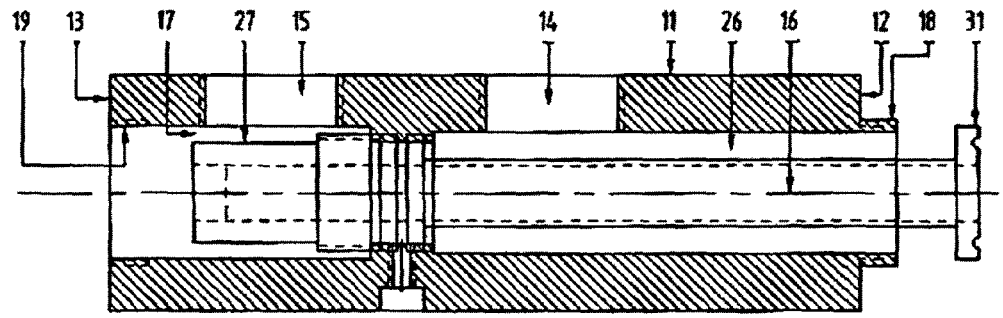
FIG. 1 shows a side sectioned view of one embodiment of a flow diverter, in accordance with the invention, for use with a valve having a valve body with an inlet and an outlet separated by a valve seat, a valve member, an actuator for displacement of the valve member into and out of engagement with the valve seat, and a bonnet in which the valve member and the actuator are housed.
Figure 2:
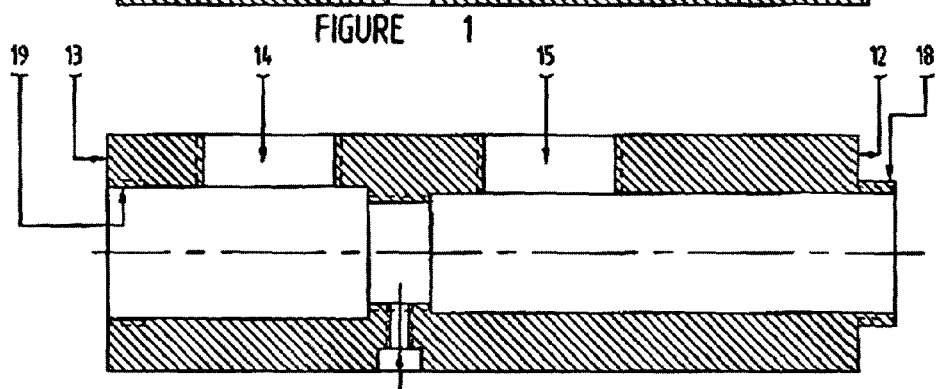
FIG. 2 shows a side sectioned view of a housing of the flow diverter.
Figure 5:
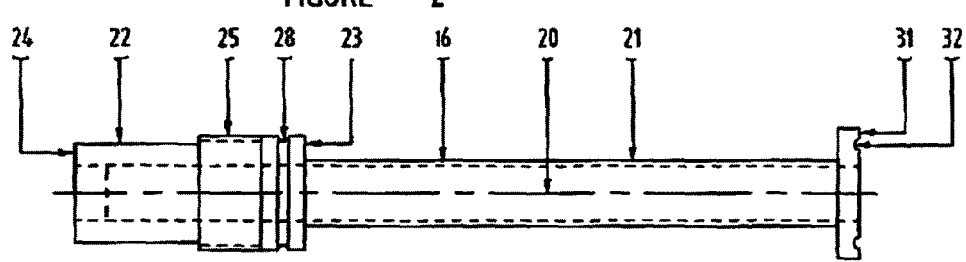
FIG. 5 shows a side view of a flow guide of the diverter.
Figure 3:
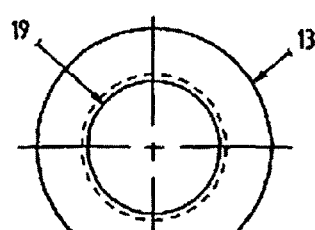
FIG. 3 shows an outlet end view of the housing of FIG. 2.
Figures 4, 6:
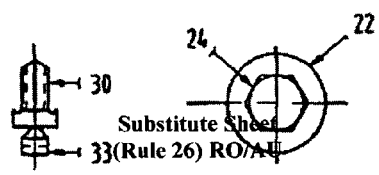
FIG. 4 shows a fastener for fixing a flow guide within the housing.
FIG. 6 shows an outlet end view of the flow guide.
Figure 7:
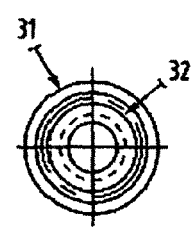
FIG. 7 shows an inlet end view of the flow guide.

In FIG. 1, reference numeral 10 generally indicates a flow diverter, in accordance with the invention, for use with a valve having a valve body with an inlet and an outlet separated by a valve seat, a valve member, an actuator for displacement of the valve member into and out of engagement with the valve seat, and a bonnet in which the valve member and the actuator are housed.

The flow diverter 10 includes a cylindrical housing 11. The housing 11 has an inlet end 12 and an outlet end 13. The housing 11 is configured to engage the valve body (not shown) at the inlet end 12 with the valve member and actuator removed from the valve body. The elongate housing 11 defines an outlet passage 14 and an inlet passage 15, the outlet passage 14 being interposed between the inlet end 12 and the inlet passage 15.

An elongate flow guide 16 is positioned within the housing 11 and is configured to engage the valve seat. Together with the housing 11, the flow guide 16 defines a flow path 17 that confines the flow of fluid, in this example water, from the valve body and out of the outlet passage 14, the outlet passage 14 and the inlet passage 15 being configured for bridging with a device such as a water flow meter.

The housing 11 includes an externally threaded spigot 18 for threaded engagement with the valve body at the inlet end 12. The housing 11 includes an internally threaded portion 19 at the outlet end 13 for threaded engagement with a further flow device, such as a faucet, valve, conduit or the like.

The flow guide 16 defines a bore 20 in fluid communication with both the inlet end 12 of the housing 11 and the outlet end 13. The flow guide 16 is generally cylindrical, as can be seen in FIGS. 1 to 7 with an inlet length 21 and an outlet length 22 wherein the inlet length 21 has a reduced diameter, such that a shoulder 23 is defined between the inlet and outlet lengths 21, 22. The outlet length 22 includes an outlet portion 24 and a peripheral flow obstruction 25 that, together with the inlet length, defines the shoulder 23.

The flow guide 16 can be positioned in the housing 11 such that the outlet passage 14 is in fluid communication with a flow path 26 defined between the inlet length 21 and the housing 11 and the inlet passage 15 is in fluid communication with a flow path 27 defined between the outlet length 22 and the housing 11. The flow obstruction 25 is in sealing engagement with an internal surface of the housing 11 so that fluid entering the inlet end 12 can be confined to the flow path 26 and fluid entering the housing at the inlet passage 15 can be confined to the flow path 27.

A peripheral locating groove 28 is defined by the outlet length 22. A drilled and threaded aperture 29 is defined by the housing 11 intermediate the inlet and outlet passages 15, 14 so that, when the flow guide 16 is in its operative position, the groove 28 is aligned with the aperture 29. A fastener such as a grub screw 30 can be threaded into the aperture 29 to bear against the flow guide 16 within the groove 28 to lock the flow guide 16 in position. The grub screw 30 has a frangible part 33 so that, when tightened, it parts to prevent tampering with the position of the flow guide 16.

A valve seat bearing member 31 is arranged on an inlet end of the flow guide 16. The flow guide 16 is configured so that, when locked in its operative position, the valve seat bearing member 31 bears against the valve seat in the valve body to which the housing 11 is fastened. As a result, fluid entering the valve body is directed into the flow path 26 and out of the outlet passage 14.

For adjustment purposes, a portion of the flow obstruction 25 is threaded to engage a complementary threaded portion of the housing 11. Furthermore, an outlet end of the flow guide 16 defines a tool engaging formation such as a socket 32 to engage a suitable tool so that an axial position of the flow guide 16 can be adjusted. In use, prior to mounting the housing 11 on the valve body, the flow guide 16 is rotated to be axially displaced towards the outlet end 13 of the housing 11.

Then, once the spigot 18 has been threaded into the valve body and secured, the flow guide 16 is rotated to be axially displaced bringing the valve seat bearing member 31 into sealing engagement with the valve seat in the valve body. As can be seen in FIG. 1, in this position, the bearing member 31 extends somewhat from the inlet end 12 of the housing 11 so that fluid can flow into the flow path 26. Furthermore, fluid is inhibited from flowing into and through the bore 20 of the flow guide 16. On the other hand, diversion of flow to the outlet passage 14 can be stopped by adjusting the flow guide 16 to be spaced from the valve seat when the housing 11 is fastened to the valve body. In that configuration, fluid is permitted to flow through the bore 20.

An O ring 32 is positioned in a face of the bearing member 31 to provide a suitable seal against the valve seat when the flow guide 16 is in an operative position.

Figure 8:
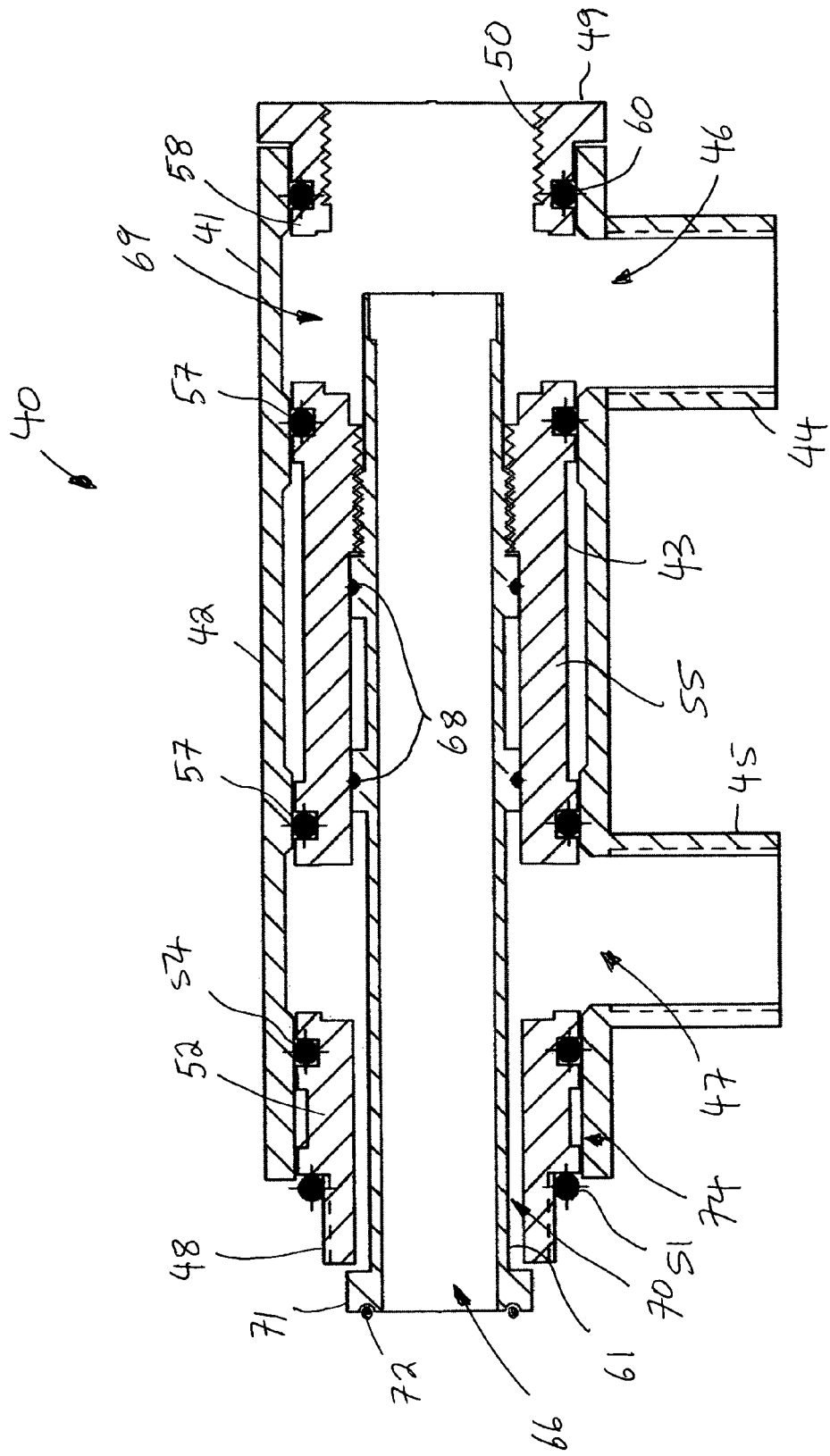
FIG. 8 shows a side sectioned view of another embodiment of a flow diverter, in accordance with the invention, for use with a valve having a valve body with an inlet and an outlet separated by a valve seat, a valve member, an actuator for displacement of the valve member into and out of engagement with the valve seat, and a bonnet in which the valve member and the actuator are housed.

In FIG. 8, reference numeral 40 generally indicates a further embodiment of a flow diverter, in accordance with the invention, for use with a valve having a valve body with an inlet and an outlet separated by a valve seat, a valve member, an actuator for displacement of the valve member into and out of engagement with the valve seat, and a bonnet in which the valve member and the actuator are housed.

The flow diverter 40 includes a housing 41. The housing 41 includes an outer housing member or cover 42 and a sleeve 43 that is received within the cover 42 in a sealed manner. The cover 42 defines inlet and outlet passages 44, 45 respectively. The sleeve 43 defines inlet and outlet apertures 46, 47 that correspond with the inlet and outlet passages 44, 45.

In this example, the sleeve 43 defines a stepped down threaded portion 48 at an inlet end. The threaded portion 48 is configured to be fastened to a corresponding threaded portion in the valve body. An outlet end of the sleeve 43 defines a peripheral flange 49 and an internal thread 50 so that a further flow device can be screwed into the outlet end of the sleeve 43. The further flow device can be a valve, faucet, conduit or the like.

The cover 42 is shorter than the sleeve 43 so that an outlet end of the cover 42 bears against the flange 49 while the stepped down portion 48 extends from the cover 42 to be aligned with a shoulder defining the portion 48. An O-ring 51 is located about the portion 48 so that the sleeve 43 can be brought into sealing engagement with the valve body.

An inlet length 52 of the sleeve 43 defines an annular groove 53 (FIG. 11) to seat an O-ring 54. An intermediate length 55, between the apertures 46, 47 defines a pair of annular grooves 56 for seating O-rings 57. An outlet length 58 of the sleeve 43 defines an annular groove 59 for seating an O-ring 60.

The sleeve 43 and cover 42 are dimensioned so that the O-rings provide a watertight fit while the cover 42 is able to rotate with respect to the sleeve 43. It will be appreciated that when the portion 48 is fastened to a valve body, the cover 42 is restrained from axial movement.

The sleeve 43 defines a peripheral locating groove 74 interposed between the annular groove 53 and the portion 48. The cover 42 defines a tapped opening 76 aligned with the groove 53, in use. A locking screw or grub can be threaded through the opening 76 to engage the sleeve 43 to lock the sleeve 43 axially with respect to the cover 42.

A flow guide 61 is received in the sleeve 43. The flow guide 61, shown in detail in FIGS. 12 and 13, is generally cylindrical and defines a bore 66. An outlet end portion 62 is threaded at 63 to engage a complementary threaded portion 64 in the sleeve 43. A tool engaging formation in the form of a socket 65 is defined in the outlet end of the flow guide 61. Thus, an axial position of the flow guide 61 relative to the sleeve 43 can be adjusted with a suitable tool by rotating the flow guide 61.

The flow guide 61 defines a pair of annular grooves 67 for seating O-rings 68. The flow guide 61 and the sleeve 43 are dimensioned so that the O-rings 68 can provide a watertight seal against an internal surface of the sleeve 43. In particular, the grooves 67 and O-rings 68 are positioned so that when the flow guide 61 engages the sleeve 43, a watertight seal is interposed between the inlet and outlet passages 44, 45. Furthermore, the sleeve 43 and the flow guide 61 are dimensioned so that a flow path 70 is defined between the flow guide 61 and the outlet passage 45 and, similarly, a flow path 69 is defined between the inlet passage 44 and the outlet of the sleeve 43.

A valve seat bearing member 71 is positioned on an inlet end of the flow guide 61. The flow guide 61 and the sleeve 43 are dimensioned so that when the flow guide 61 is in an operative position and the sleeve 43 is fastened to the valve body, the valve seat bearing member 71 bears against the valve seat in the valve body so that water entering the valve body is directed into the flow path 69.

In use, the flow guide 61 is rotated so that it is axially displaced towards the outlet of the sleeve 43. The sleeve 43 is then fastened to the valve body. The flow guide 61 is then rotated so that it is axially displaced towards the valve seat such that the valve seat bearing member 71 bears against the valve seat. To facilitate sealing, an O-ring 72 is positioned in a face of the member 71. Instead, if a flow through the outlet passage 45 is not required, the flow guide 61 can be rotated so that the valve seat bearing member 71 is spaced from the valve seat. Thus, water entering the valve body can flow directly through the bore 66.

In use, an inlet of a bridging device is connected to the outlet passage 45 and an outlet of the bridging device is connected to the inlet passage 44. Thus, when the flow guide 61 is in an operative position, water is diverted through the bridging device. In one embodiment, the bridging device can be a water meter.

The diverter 40 is assembled by simply sliding the components into engagement with each other prior to fastening the sleeve 43 to the valve body. The sleeve 43 defines one or more drilled and tapped openings 73. A grub screw (not shown) can be threaded through each opening 73 to secure the flow guide 61 with respect to the sleeve 43, if necessary. The cover 42 defines a number of axially slotted openings 75 to correspond with a position of the openings 73 so that access to the grub screws is provided. The simple manner in which the components are assembled provides a flow diverter which is relatively quick to fit.

The flow diverter of the invention finds particular application for the retrofitting of flow devices to existing plumbing installations. In many such installations, there is simply insufficient space in which to mount a device such as a water meter. For example, in high-density living areas, it may become necessary to install individual water meters for each dwelling. A convenient location for a water meter would be the supply valve. However, the supply valve may be positioned in a location in which it is not possible to mount a water meter or, if the water meter is mounted in that location, it may not be possible to read the water meter or to connect electronic reading devices to the water meter. In such cases, it is desirable that flow of the water be diverted to a location in which it is convenient to mount the water meter. Thus, with the present invention, it is possible to remove the existing bonnet, valve member and actuator from the valve body and to fasten the housing of the flow diverter to the valve body. It will be appreciated then that the water meter can be connected to the outlet and inlet passages of the housing. By providing the diverter of a suitable length dimension it is possible to have the water meter spaced from the existing valve body to a required extent.

Furthermore, the thread and dimensions of the outlet end of the sleeve can be configured to permit the components removed from the valve body to be connected to the outlet end. As a result, the functionality of the original valve is maintained with the benefit of a flow device, such as a water meter upstream of the valve.

It will be appreciated that the flow diverter can be provided in a number of different dimensions to suit the particular application.

Furthermore, the flow diverter can be used to divert flow through a restrictive device instead of a water meter. For example, where a particular dwelling or other water user requires consumption restrictions, it is possible to position a bridging conduit containing a flow restrictor between the outlet and inlet passages of the diverter.

The adjustability of the flow guide provides a means whereby diversion can be overridden. For example, where it becomes no longer necessary to meter a water supply or restrict consumption, the flow guide can be adjusted to be spaced from the valve seat, allowing water to pass through the flow guide.

Throughout the specification, including the claims, where the context permits, the term "comprising" and variants thereof such as "comprise" or "comprises" are to be interpreted as including the stated integer or integers without necessarily excluding any other integers.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

The invention claimed is:

1. A flow diverter for use with a valve having a valve body with an inlet and an outlet separated by a valve seat, a valve member, an actuator for displacement of the valve member into and out of engagement with the valve seat, and a bonnet in which the valve member and the actuator are housed, the flow diverter comprising
an elongate housing having an inlet end and an outlet end and configured to engage the valve body at the inlet end with the valve member and actuator removed from the valve body, the elongate housing defining an outlet passage and an inlet passage, the outlet passage being interposed between the inlet end and the inlet passage;
the elongate housing including an outer housing member and a sleeve that is received within the outer housing member in a sealed manner and that defines inlet and outlet apertures that correspond with inlet and outlet openings of the outer housing member, respectively to define the inlet and outlet passages; and
an elongate flow guide received within the sleeve and defining a peripheral projection that is engaged in a sealing manner with an internal surface of the sleeve, the flow guide being capable of being positioned such that the peripheral projection is interposed between the inlet and outlet apertures to direct fluid received at the inlet out through the outlet aperture and outlet opening, the flow guide being configured to engage the valve seat and, together with the housing, to define a flow path that confines the flow of fluid from the valve body and out of the outlet passage, the outlet passage and the inlet passage being configured for bridging with a device such as a water flow meter.

2. A flow diverter as claimed in claim 1, in which an inlet end of the sleeve is fastenable to the valve body and the flow guide defines a valve seat bearing member at an inner end of the flow guide, the flow guide being axially adjustable with respect to the sleeve to bring the valve seat bearing member into sealing engagement with the valve seat when the sleeve is fastened to the valve body such that a fluid flow path is defined from an inlet end of the sleeve, between the sleeve and the flow guide to the outlet passage.

3. A flow diverter as claimed in claim 2, in which the flow guide itself defines a bore so that, when the flow guide is axially displaced to disengage the valve seat bearing member from the valve seat, fluid can flow directly through the bore from the inlet end to the outlet end of the housing without being diverted.

4. A flow diverter as claimed in claim 2, in which the flow guide is threaded along a portion of its length intermediate the peripheral projection and an outer end to engage, in a threaded manner, a corresponding threaded portion of the sleeve, the threaded portions of the flow guide and the sleeve being configured to permit said axial adjustment of the flow guide relative to the sleeve so that, once the sleeve has been fastened to the valve body, the flow guide can be adjusted so that the valve seat bearing member can engage the valve seat in a sealing manner.

5. A flow diverter as claimed in claim 1, in which the outer housing member is rotatable with respect to the sleeve but is constrained against axial displacement relative to the sleeve.

6. A flow diverter as claimed in claim 1, in which an outlet end of the sleeve defines an internally threaded socket to permit a fluid flow device such as a valve or conduit to be fastened to the housing.

* * * * *